Aug. 31, 1937.  J. B. BERRIGAN ET AL  2,091,623
FILTERING PRESS
Filed Aug. 24, 1932   9 Sheets-Sheet 1
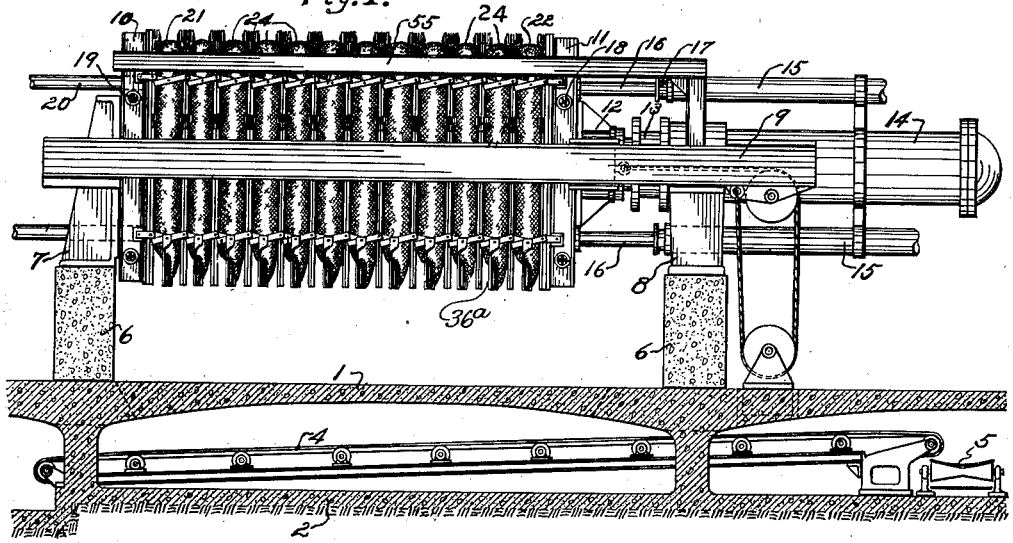
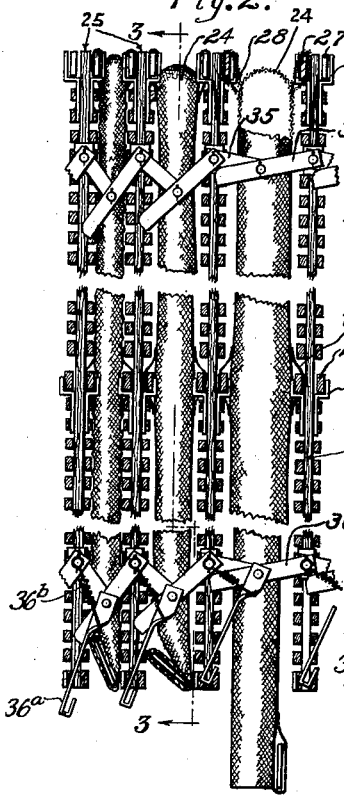
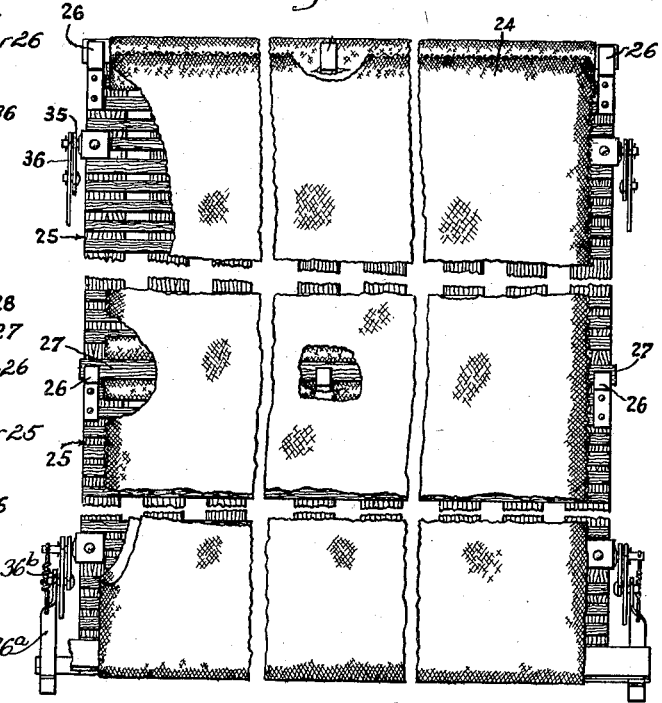
Inventors:
John B. Berrigan
Felix P. Gross
Wesley V. Woodruff

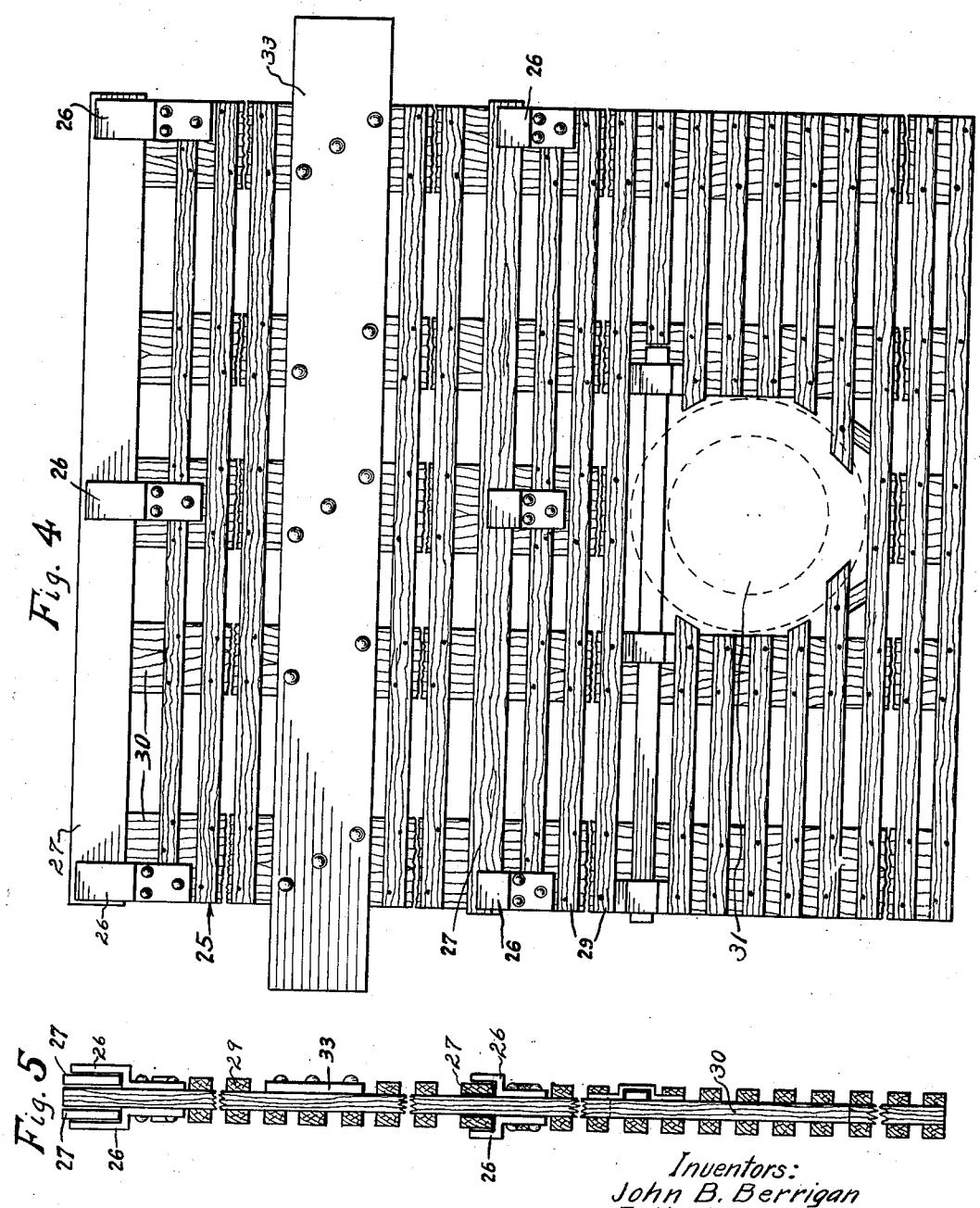

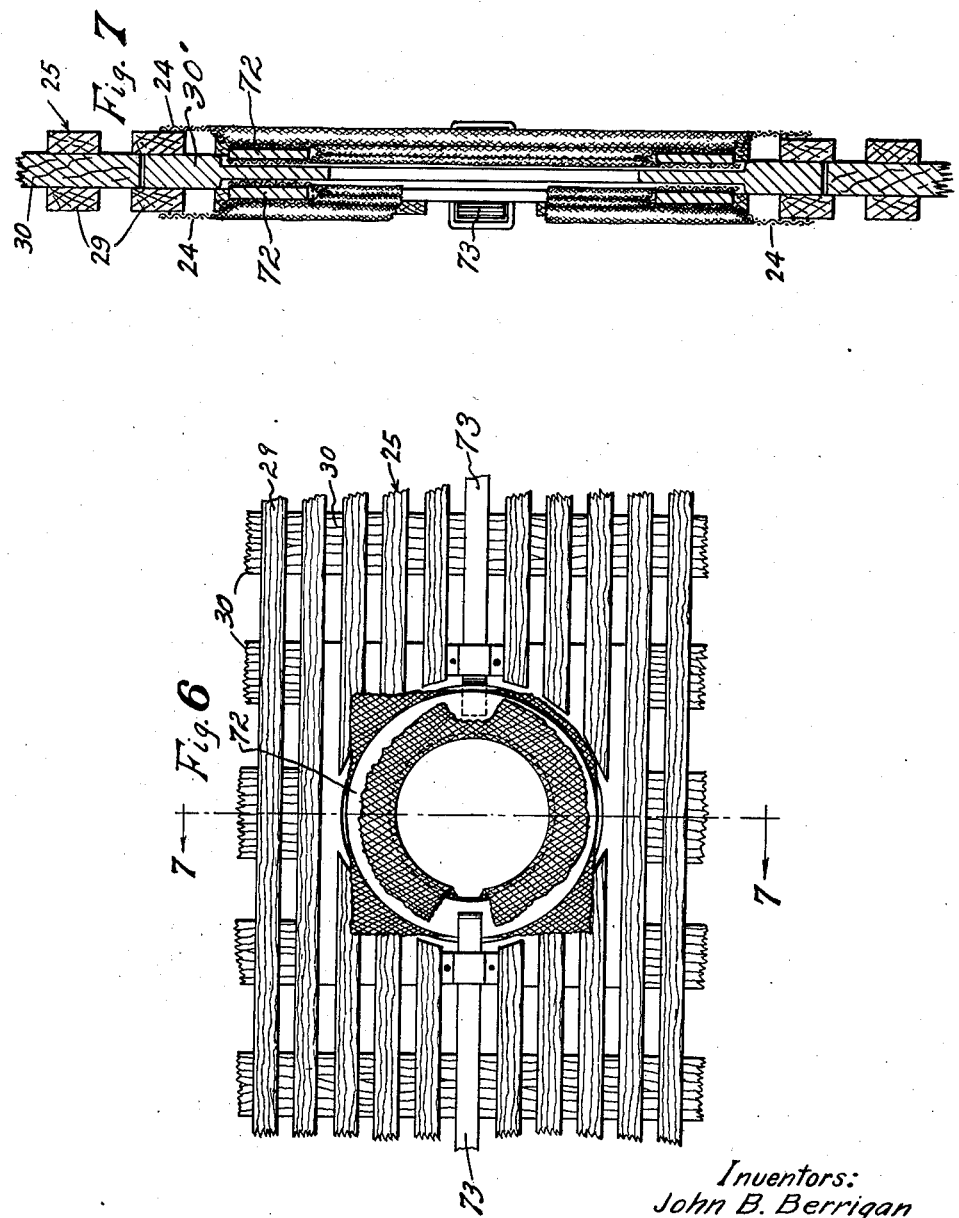

Aug. 31, 1937.   J. B. BERRIGAN ET AL   2,091,623
FILTERING PRESS
Filed Aug. 24, 1932   9 Sheets-Sheet 4
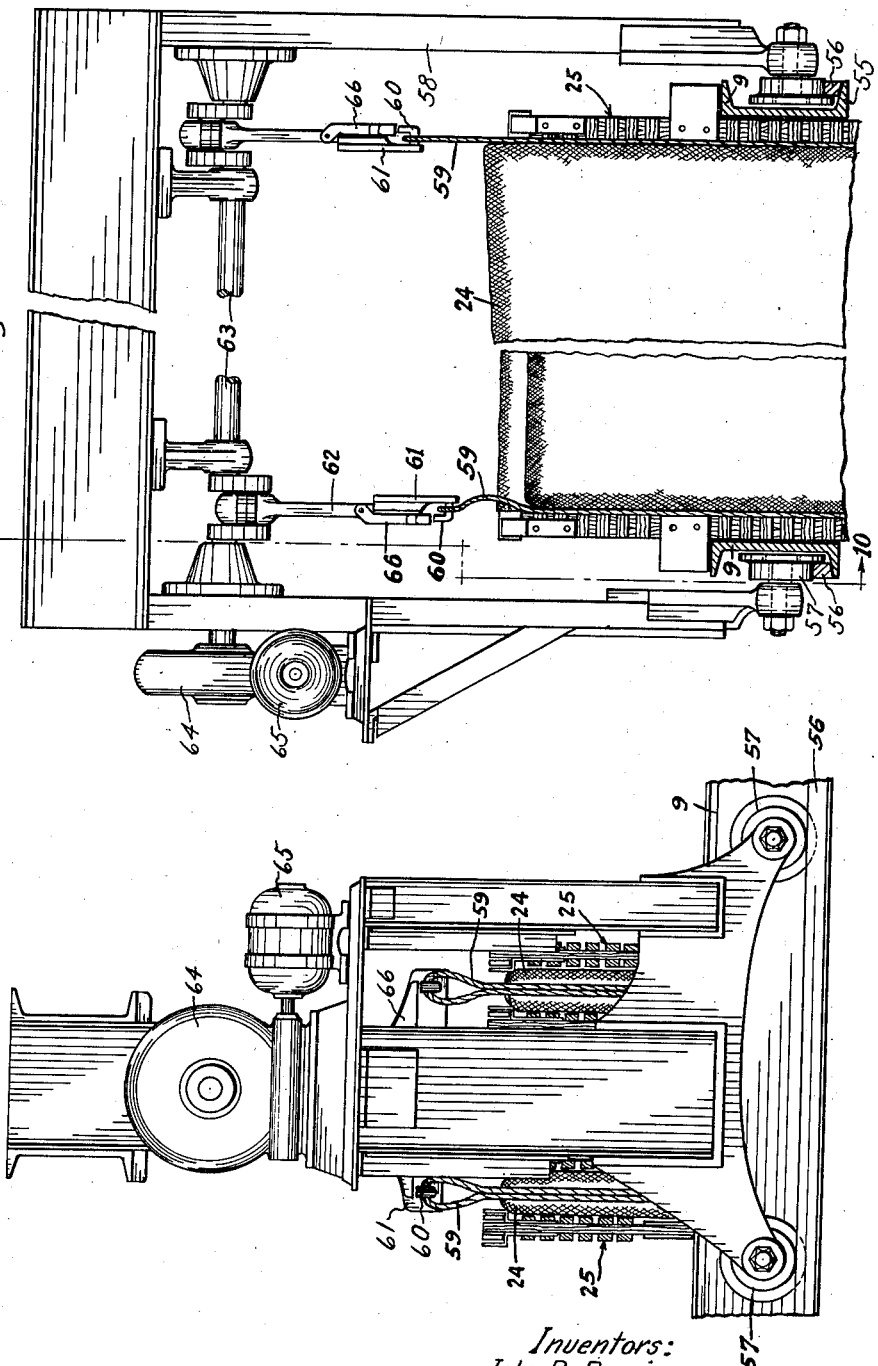
Inventors:
John B. Berrigan
Felix P. Gross
Wesley V. Woodruff Aug. 31, 1937.  J. B. BERRIGAN ET AL  2,091,623
FILTERING PRESS
Filed Aug. 24, 1932  9 Sheets-Sheet 5
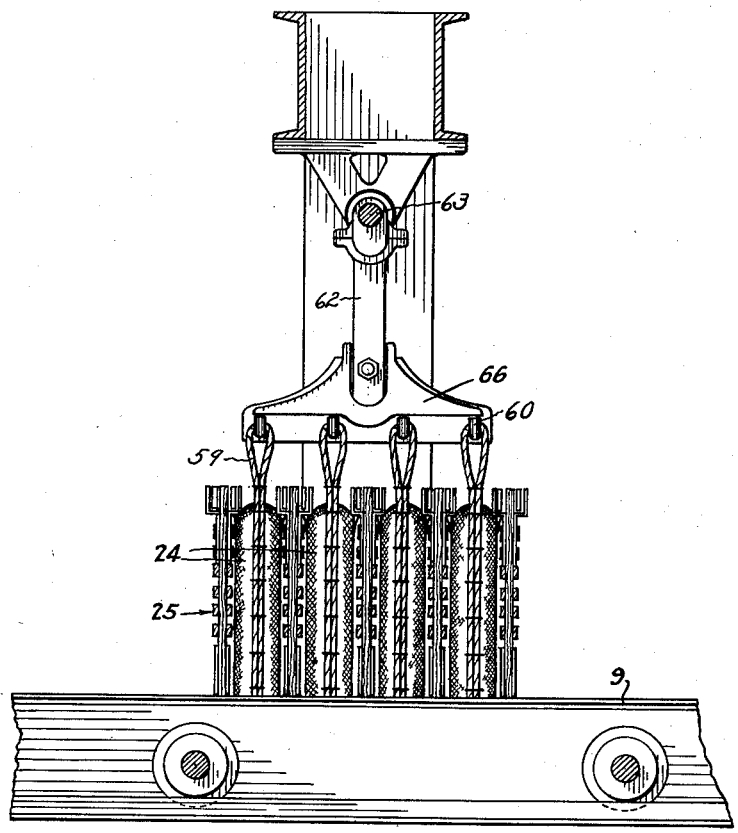
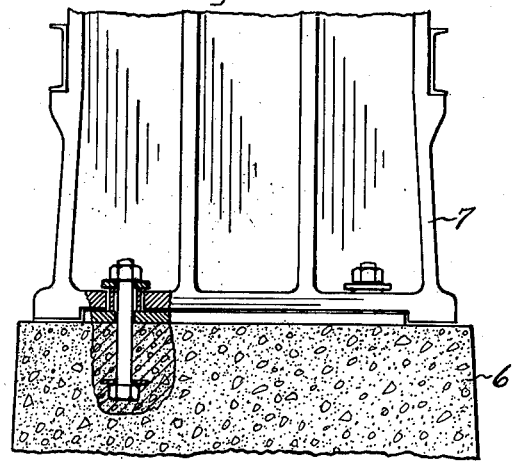
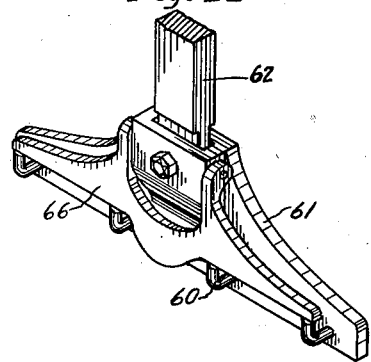
Inventors:
John B. Berrigan
Felix P. Gross
Wesley V. Woodruff

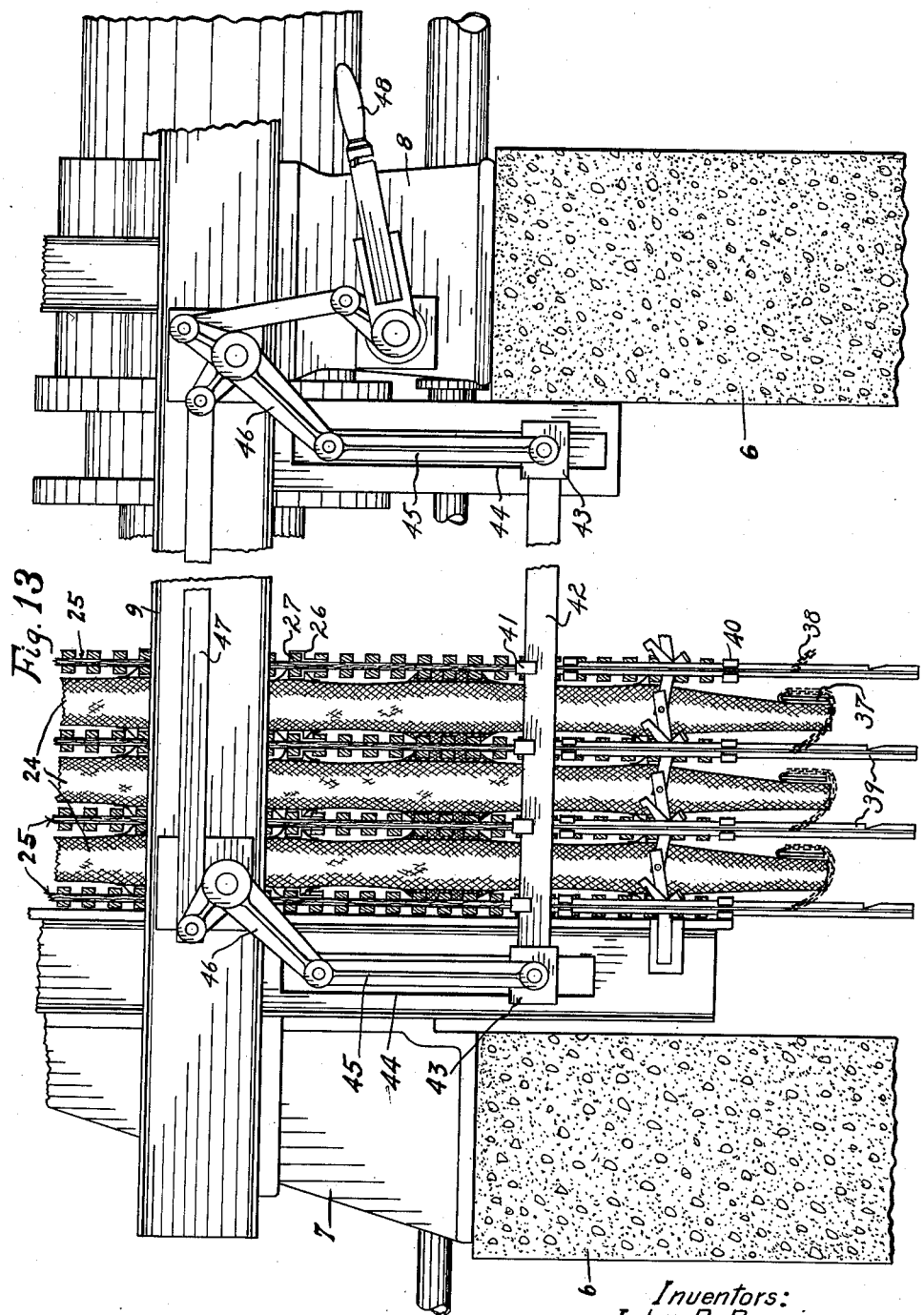

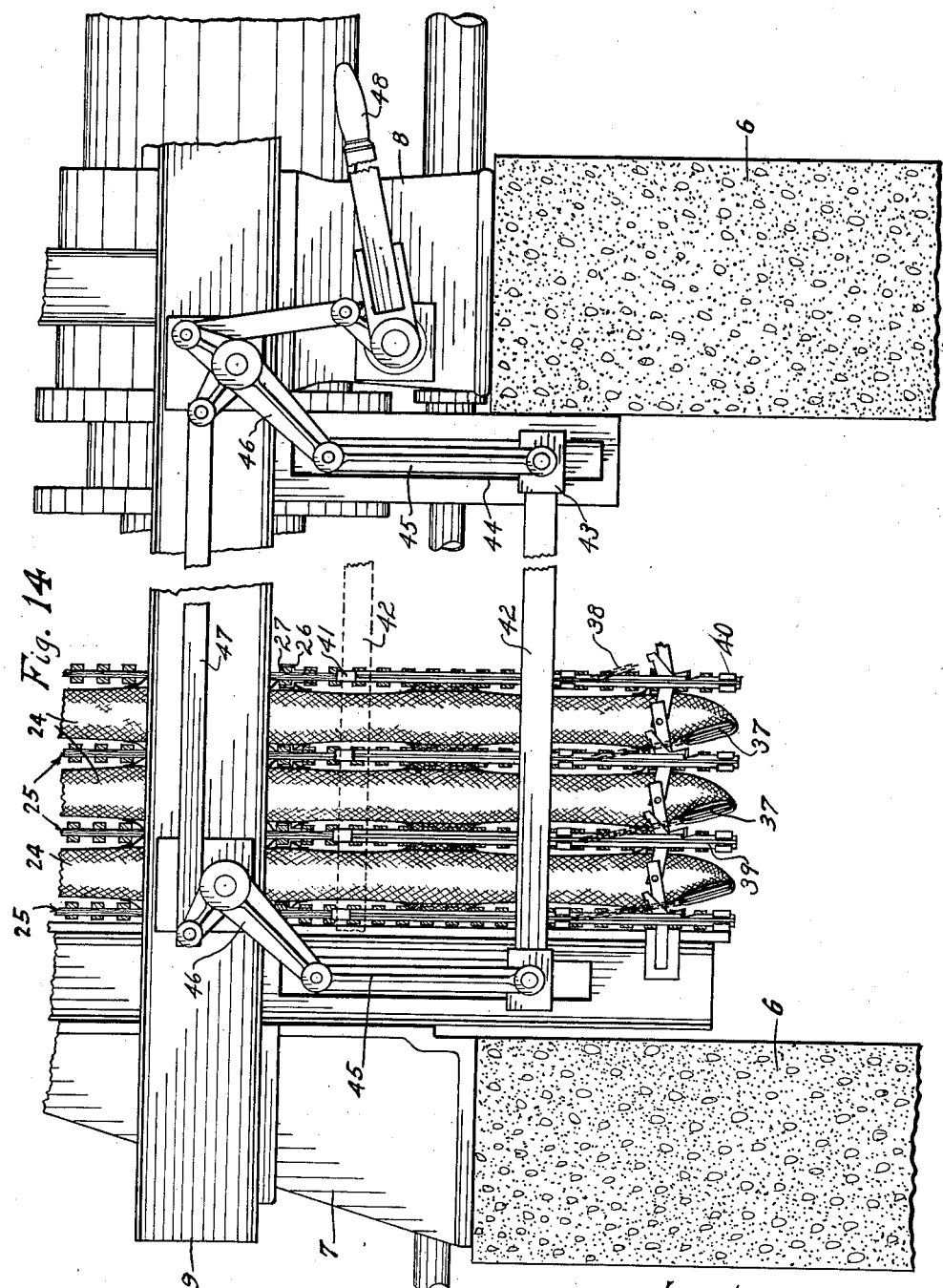

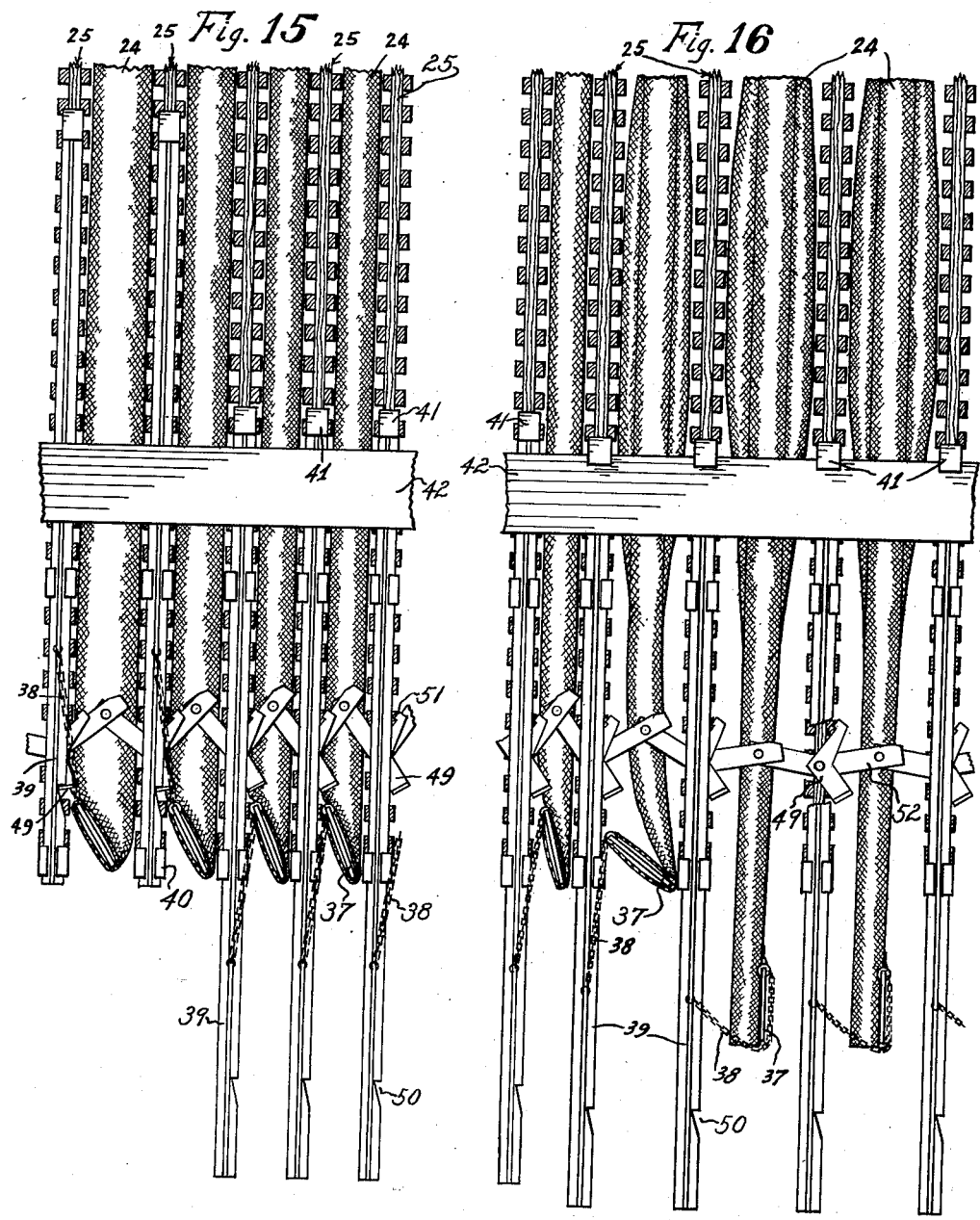

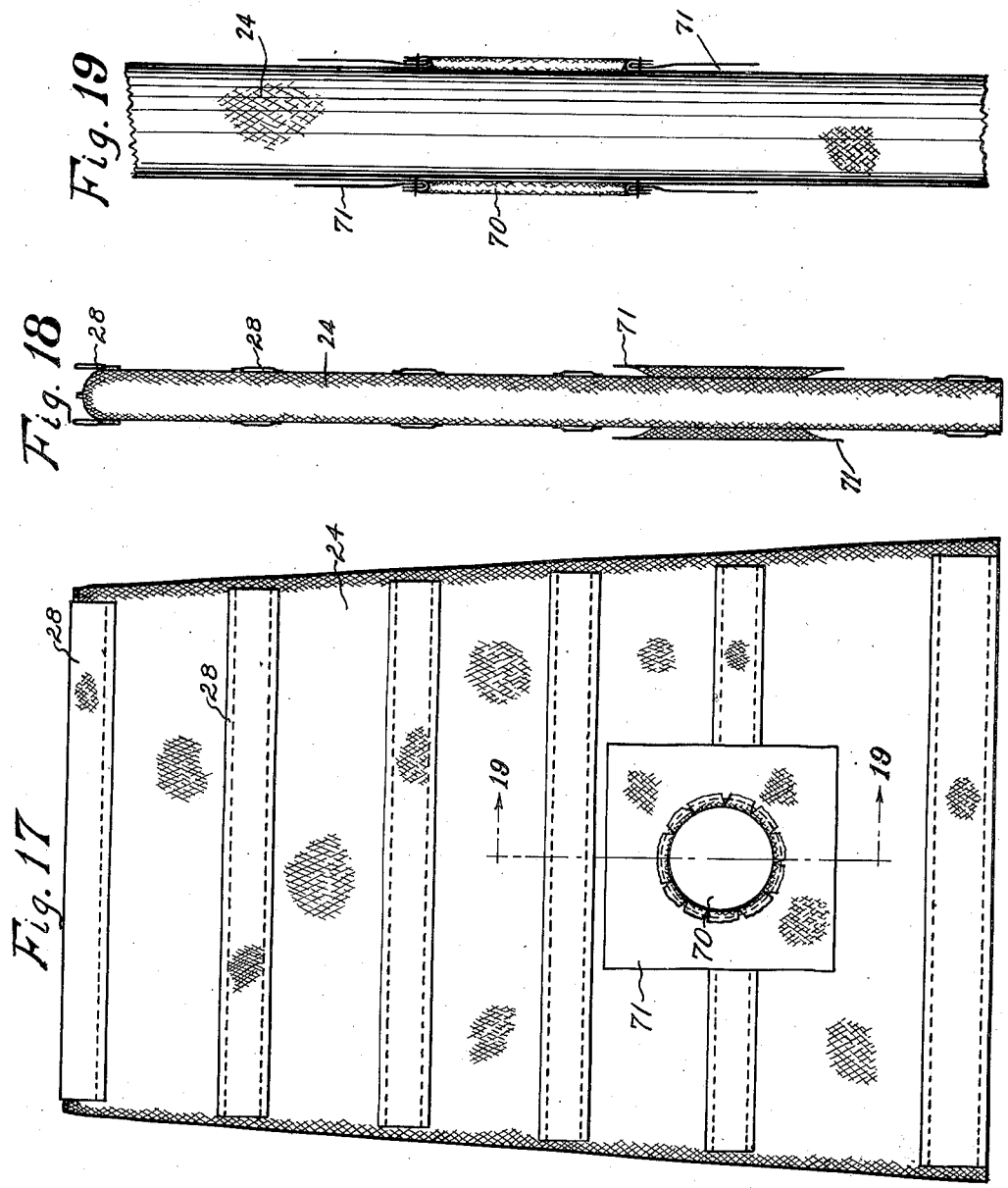

Patented Aug. 31, 1937

2,091,623

UNITED STATES PATENT OFFICE 2,091,623

FILTERING PRESS

John B. Berrigan, Oak Park, Felix P. Gross, Wilmette, Ill., and Wesley V. Woodruff, Hammond, Ind., assignors to The Press & Drier Co., a corporation of Illinois Application August 24, 1932, Serial No. 630,226

16 Claims. (Cl. 100—50)

This invention relates to filtering presses for pressing liquids from solid matter in suspension such as, for example, in the treatment of sewage where sludge is pumped from settling tanks and then by means of additional treatment, such as being passed through a filtering press and a drier, the material is dehydrated for use as fertilizer or for burning. The improvements herein disclosed are applicable to pressing apparatus such as described in Patents Nos. 1,454,128 of May 8, 1923, issued to K. P. Malon; No. 1,538,884 of May 26, 1925, issued to J. J. Berrigan; No. 1,538,885 of May 26, 1925, issued to J. J. Berrigan; No. 1,540,353 of June 2, 1925, issued to K. P. Malon.

In the treatment of sewage, having reference to the separation of solid matter from liquid, it is desirable to afford means of large capacity which will deliver the solid matter with the water content so low that the solid matter may be rapidly disposed of by immediate burning, or may be economically dried for fertilizer or for later use as fuel. To attain such end, there is no known means available at the present time superior to filtration under pressure through burlap, or similar material.

By that means the water content may be so far reduced as to avoid the necessity of drying preliminary to burning, if reduction to fertilizer, or to a dry fuel for storage, is not desired.

The construction now provided includes numerous improvements in the class of filter presses to which it relates. The improvements render such machine more automatic, sanitary and efficient.

The method of operation of the press in the case of treatment of sewage is also improved by the use of ferric chloride to effect coagulation, or flocculation, of solids; consequently more rapid and complete filtration as pressure is applied. The pressure is applied gradually at an increasing rate so that finally, before the solid cakes of material are discharged from the press, such material will be subjected to pressures on the order of seventy-five pounds, more or less, per square inch, with the resulting moisture content so low that immediate burning is feasible, or if further dehydration by the application of heat is necessary, the amount of heat required is reduced to a minimum. It is necessary to use low pressure at the beginning of the dehydrating operation since the bags may be easily broken, especially at the edges of the bags where the bags are not enclosed by racks, while the contents thereof are in a fluid state, but as the liquid flows out of the contents of the bags, and they change from a fluid to a non-fluid state, increasing pressures and ultimately high pressures may be applied without danger of breaking the bags. The low pressure is employed while the liquid is transmitting pressure in all directions according to Pascal's law. During this time the solid particles are driven toward the walls of the bags, being more concentrated near the material forming the bags, and serving to filter the liquid and catch finer particles moving toward the bag walls. A means such as an open petcock valve, with sampling tube reaching the core of the bag contents, which core is the last portion of bag contents to lose fluidity, indicates by stoppage of flow the change from fluid to non-fluid condition of the contents of the bags. After this, high pressure may be applied without danger of breakage.

The objects of the invention include the provision of a large capacity machine which is mainly automatic in its operation except as subject to manually operable control levers; the provision of an improved filtering bag suspension means, and improvements in pressing racks located between the bags and having linkage connections insuring successive action on the different bags in the restoring movement; to provide a means for automatically opening the bags for discharging the compressed material therefrom and thereafter closing the bags for the next filling operation.

A further object of the invention is to provide a conveyor system for presses of this class which serves to drain liquid and then to carry away the solid matter from which the liquid has been removed. A further purpose of the invention is to provide a bag agitating or shaking means arranged to operate simultaneously upon a group of bags, in such cases where the material handled has a tendency to adhere to and remain in the bags even after the opening of their lower ends. It is also an object of the invention to provide filter bags of such form and construction as to permit free discharge of the cakes of compressed material upon the opening stroke of the machine. It is also an object of the invention to improve filling conditions by providing telescoping pipes in place of hitherto available means, and furthermore to reduce operating time, increase output, and secure a drier filter cake, by the use of appropriate preliminary chemical treatment of the fluid to be filter pressed.

The objects of the invention are accomplished by means of a construction as illustrated, in which:

Figure 1 shows a filtering press and a conveyor system in side elevation, with a concrete base upon which the press is mounted indicated in section.

Fig. 2 is an enlarged fragmentary side view of some of the filtering bags, and shows the pressing racks and the connecting linkage therebetween more in detail.

Fig. 3 is a fragmentary face view of one of the bags partly broken away to show the latticed pressing member between it and the next bag.

Fig. 4 is an enlarged face view of one of the pressing racks.

Fig. 5 is an end view of the construction shown in Fig. 4.

Fig. 6 is a fragmentary face view of one of the pressing racks showing the connecting means between filtering bags which passes through the rack and affords communication between the bags so that the liquid may flow from one to another.

Fig. 7 is an enlarged sectional view taken on the line 7—7 of Fig. 6.

Fig. 8 is a detail showing in side elevation bag shaking means.

Fig. 9 is a fragmentary end view of the bag shaking mechanism.

Fig. 10 is a sectional detail taken on the line 10—10 of Fig. 9.

Fig. 11 is a perspective view of an element of the shaking mechanism, by which this mechanism is temporarily connected with the bags to support the latter during the shaking operation.

Fig. 12 is a fragmentary detail showing one of the end supports of the machine having a connection with a foundation pier which permits expansion and contraction of the frame structure of the machine under operating stresses and temperature changes without imparting undue stresses to the foundation.

Fig. 13 is an enlarged fragmentary detail in side elevation for illustrating bag opening and closing mechanism.

Fig. 14 is a view similar to that shown by Fig. 13 as the machine would appear after the bags have been closed.

Fig. 15 is a fragmentary enlarged detail view to illustrate the operation of the bag closing mechanism during a pressing operation of the machine.

Fig. 16 is a view similar to that shown by Fig. 15, except that the position of the bag closing mechanism is altered to show it releasing the bottom ends of the bags upon an opening movement of the press.

Fig. 17 is a face view of one of the bags of tapered shape.

Fig. 18 is an edge view of one of the bags, showing bag supporting and connecting means.

Figure 19 is an enlarged fragmentary sectional detail taken on the line 19—19 of Fig. 17, to illustrate more clearly the construction of the bags at the points of connection at the communicating openings where the bags are connected together.

In general the improved filtering press consists of a frame structure arranged to support slidably and edgewise a series of burlap bags of considerable length and width with reference to thickness, and arranged with their surfaces of largest area parallel. A stationary platen is supported at one end of the series of bags, and a movable platen is arranged at the other end of the series. The movable platen is mounted slidably upon the frame structure and is actuated by a plunger fitting in which fluid is admitted under pressure for the purpose of shifting the movable platen toward the stationary platen, thus compressing the material in the bags between the two platens.

Pressing racks are also slidably mounted on the machine frame and serve to separate the bags and transmit pressure to the surfaces thereof and permit ready drainage of the liquid expressed. These racks are connected by a linkage system which serves to space the racks when the press is opened after the pressing operation, and transmit motion from one to the other in succession, so that each bag will be opened in its proper succession or turn, thus procuring a progressive dumping action and avoiding simultaneous dumping of all bags and the clogging of conveyor equipment.

As the movable platen returns to the original position after a pressing operation, the side walls of each bag in succession are drawn apart away from the compressed material therein, due to connections between the side walls of the bags and the pressing racks, and the bags are automatically opened at their bottom ends so as to discharge the caked material therein. If the discharge does not take place freely by gravity, groups of the bags may be agitated by a motor driven shaker.

It is not always necessary to make use of the shaking mechanism, which may be dispensed with, particularly when the bags are of tapered form, as described further on, with the discharge openings of the bags at their lower and larger ends.

After the discharging operation, all bags may be closed by a single operation of a mechanism provided for this purpose. The bags are then filled with the fluid material to be filtered, through telescoping conduits communicating with one of the end bags through the adjacent movable platen, and through stationary conduits communicating with the other end bag through the stationary platen.

The bags communicate with each other through connectors such as illustrated in the patent to Berrigan, No. 1,811,533, of June 23, 1931.

At the beginning of an operation, the bags are empty, their bottom seals closed, the racks evenly spaced at maximum separation, and the movable platen is at maximum distance from the stationary platen. The bags are then filled through the telescoping and stationary conduits, and during the filling operation some clear liquid is filtered out by a combination of gravity and filling pressure. When the bags are filled and preliminary filtering has proceeded to a satisfactory stage, the filling valves are closed, and hydraulic pressure is applied to the plunger carrying the movable platen, and all the bags are simultaneously placed under compression.

Beneath the floor which supports the machine is an inclined conveyor 4 which during the filling, filtering and pressing operations remains stationary. During the combined filtering and pressing operation the liquid which is squeezed or pressed from the bags passes through openings in the floor, and drops onto the upper reach of the conveyor and runs downwards to an effluent channel at the lower end of the conveyor. After the pressing operation, when the solid matter is discharged from the press, the conveyor 4 is driven so that the upper reach thereof moves away from the said effluent channel. By so driving the conveyor the solid matter which is discharged from the bags is discharged from the upper end of the conveyor. A transversely extending conveyor 5 underlies the upper end of the conveyor 4 and operates to receive the discharged solid material from the conveyor 4 and to discharge it where desired.

As shown in the drawings, a concrete structure forms the rest for the machine, and consists of floorings 1 and 2, arranged to provide a depression for the inclined conveyor 4 below an opening beneath the press in floor 1.

The machine frame rests upon posts 6, and includes the end castings 7 and 8, which carry the longitudinal channel frame members 9, one at each side of the machine. A stationary platen 10 is supported on the casting 7. A movable platen 11 is carried by a plunger 12 extending through a stuffing box 13 at the end of cylinder 14 supported in casting 8. Supply conduits 15 for carrying the unfiltered fluid material to the press bags are supported by the stationary cylinder 14 and the casting 8. The platen 11 has projecting therefrom conduits 16 which pass through stuffing boxes 17 at the ends of the stationary conduits 15. The conduits 16 telescope with the conduits 15 and communicate with the latter in all positions of the platen 11. Shut-off valves 18 are carried by platen 11.

The purpose of the telescoping supply conduits is to provide a convenient, neat and sanitary method of filling the bags, as these telescoping conduits eliminate the need for connecting and disconnecting the movable platen 11 and end bag 22 from the supply source during each operation, as has heretofore been necessary in the operation of presses of this class.

The stationary platen 10 is provided with shut-off valves 19 controlling flow to the press of unfiltered liquid from supply conduits 20 connected with the platen 10.

The platens 10 and 11 respectively communicate with the end filtering bags 21 and 22, Fig. 1. These end bags and the intermediate filtering bags 24 communicate with each other through connectors such as illustrated in the patent by J. B. Berrigan, No. 1,811,533, of June 23, 1931.

A series of the pressing racks 25 are located between the series of filtering bags. Each rack carries cleats 26 in which rest transverse bars 27, from which the bags are suspended by loops 28 passing over the bars. In order to remove an injured bag, it is disconnected from the adjacent bags and racks and the bars are removed from the cleats and permitted to drop with the bag.

The filtering bags may be rectangular but preferably trapezoidal in form, as illustrated by Fig. 17, being wider at their lower discharge ends than at the top, which is important for the free discharge under its own weight of the caked solid material. It is desirable to have a smooth and even surface on the inside of the bags for the free discharge of pressed cake therefrom. Thus the seams at the sides and tops of the bags are on the outside. The bags are in some instances, according to work performed by the machine, reinforced throughout, or in parts, with a flexible metallic mesh. The racks also are provided with a covering such as perforated metal or wire cloth on the bag engaging surfaces thereof, when necessary for protecting the bags.

Each bag is provided with one or more openings 70, the edges of which are turned outwardly and sewed to pieces of material 71, which carry the connector rings 72, as illustrated in Figs. 6 and 7. These rings are drawn tightly against the racks and seal the connections between bags by means of slide bars 73, Fig. 6, carried by the racks. Circular openings are provided in the racks.

The pressing racks are preferably made, as illustrated in Figs. 4 and 5, by securing two sets of horizontal slats 29 to intermediate vertical slats 30. An opening 31 is provided in each rack at the location of the connectors 72 which provide the communication between adjacent bags. Upon an opening movement of the press, these connectors also serve to pull the side walls of the bags away from the cakes of pressed material. Each rack has bolted thereto a horizontally extending bar 33 which projects at its ends over the horizontal channel frame members 9. Through this support the racks and the filtering bags suspended therefrom may be slid along the machine frame structure under the action of platen 11 subject to hydraulic pressure in cylinder 14. When there is a tendency for the bags to lift as a result of the lateral pressure applied thereto, duplicate horizontal bars similar to 33 may extend from the racks to beneath the frame channels 9.

In order to transmit motion successively from rack to rack on the opening movement of the press, the racks are connected together in series by means of the toggle links 35 and 36, which are pivotally connected together and to the racks. The links 36 are long enough to engage each other when the press is open so as not to pass the dead center position.

As shown in Fig. 2, the lower series of toggle links connecting the racks carry hooks 36a for hooking under and securing the closing means at the lower ends of the bags as shown in Fig. 1 when the closing means provided is manually folded as described in the patent to Malon, No. 1,454,128 of May 8, 1923. The hooks 36a may be provided with retaining springs 36b if desired.

Figs. 13 and 14 illustrate a preferred arrangement of this bag closing means whereby all bags in the series may be closed in one operation. The sealing plate 37 extending along the lower open end of each bag is connected by chains 38 with slides 39 carried at the edges of the racks 25 and of T-form in section, so as to slide between the lugs 40 on the racks. By lifting the slides the maximum distance a double fold is made in the bottom of the bags as illustrated in Fig. 14. Single folds are also practicable, and the closing mechanism may be arranged accordingly.

The upper end of each of the slides has a shoulder 41 projecting over a lifting bar 42 at each side of the machine. These bars are carried by slide blocks 43 vertically movable in guides 44 by means of connecting rods 45 suspended from the arms 46 pivoted on the machine frame and connected for simultaneous operation by the link 47. These arms are raised and lowered by lever 48 operatively connected therewith and pivoted to the machine frame.

Before the bags are filled preliminary to a pressing operation, the lever 48 is depressed, thus lifting all the slides 39 and thereby folding closed the bottom ends of the bags. The slides 39 are latched in their uppermost positions by the pawls 49, Fig. 16, engaging notches 50 in the slides. These pawls have shoulders 51 extending over the toggle links 52 so as to be engaged thereby at the completion of a compressing operation, when the pressure racks 25 are in their closest relation.

The slides 39 then drop down as far as permitted by the chains 38, the holding bars to which these chains are attached being retained by the racks. Then upon the opening motion of the press, as the racks successively separate from right to left, the folded ends of the bags drop downwardly, allowing caked material to discharge, and permitting the slides 39 to return to their initial position with the shoulders 41 at rest on the bars 42.

The toggle linkage 52 shown in Figs. 13, 14, 15 and 16 is arranged to fold upwardly instead of downwardly as illustrated at 35 and 36 in Fig. 2.

In cases where the material which is filtered, and from which the liquid has been expressed, has a tendency to adhere to the walls of the bag when the press is open, the shaking structure, illustrated by Figs. 8, 9 and 10, is used for shaking the bags. This is done by an alternate lifting and dropping action performed upon the bags, either individually or in groups simultaneously. The shaking mechanism is supported by the frame channel bars 55, these having rails 56 which fit wheels 57 carried at the lower end of the supporting frame 58 of the shaking mechanism. When the latter is in use individual bags or groups of the bags are successively shaken. The bags have hand loops 59 secured thereto and by which they may be attached to hook 60 on a cross head 61, suspended from pitmans 62 operated by crankshaft 63. This crank is driven through gearing 64 by motor 65. Each cross head 61 has a pivoted retaining plate 66 for preventing accidental unhooking of the bags suspended therefrom.

At the beginning of operation of the press it is necessary to first close the lower ends of all the bags, which is preferably accomplished by operation of lever 48, Fig. 13. When this lever is depressed the slide bars 39 are lifted and through the chains 38 effect nearly a complete revolution of the folding bars 37, and thus place a single or double fold and seal in the bottom of each bag. The slides are retained in their upper position by the latching pawls 49.

Then in the case of sewage sludge, preliminary to filling the bags, a chemical, such as ferric chloride, is injected into the fluid material for the purpose of coagulating the solids therein. Such treatment of the fluid sewage sludge insures the freer disassociation of the water from the flocculent or coagulated solids in the bags, so that the water flowing therefrom is clear and may more freely escape through the material of which the bags are made. The bags are then filled by opening the valves 18 and 19 in the platens 10 and 11.

Then the valves 18 and 19 are closed, and through hydraulic pressure in cylinder 14 the plunger 12 and the movable platen 11 carried thereby, slowly shift to the left, Fig. 1. The racks 25 are forced toward each other, compressing the bags and the material therein. The compression stroke of the cylinder takes place soon after the introduction of ferric chloride into the fluid under treatment, otherwise the benefit of the ferric chloride may be largely lost. The complete mixing, press filling and pressing operation should be accomplished as rapidly as possible, and with this end in view, when the press is of very large capacity, a plurality of communicating openings 70, Fig. 17, are provided in each bag. The communicating openings 70 are in line with the filling conduits 16, to facilitate rapid filling and prevent absorption of hydraulic shocks during filling by a single end bag alone.

As the pawls 49 are engaged by the toggle links 52, the slide bars drop as far as permitted by their chain connections 38 with the folding bars 37.

After all of the bags have been compressed to the desired extent, the movement of the platen 11 to the right, Fig. 1, takes place (by counterweight or other substitution therefor).

Through the toggle linkage connecting the platens and racks, the racks are successively moved away from each other from right to left of the machine and through the bag connectors, bag supports and separating bars cause the side walls of the bags to draw apart. As each rack is separated so far as to allow unfolding of the bottom of the adjacent bag, the folding bar 37 drops downwardly, as illustrated by Fig. 16, unfolding the seal, and the material from which the liquid has been expressed may then drop from the bags successively onto the conveyor. If such material is light and adherent the shaking mechanism shown in Figs. 8, 9 and 10 is operated to shake successively different groups of the filtering bags.

Although but one specific embodiment of this invention has been herein shown and described, it will be understood that certain details of the construction shown may be altered or omitted without departing from the spirit of this invention as defined by the following claims.

We claim:—

1. A filtering press comprising a series of filtering bags and alternating pressing racks, means for imparting motion to said racks toward and away from the filtering bags therebetween, and connections between said racks for causing successive movement thereof from end to end of the machine, each of said bags being provided with a discharge opening at its lower end, and means for simultaneously closing the open ends of the bags before the compressing operation, and means for successively releasing the bag closing means as the racks move toward their most widely spaced position.

2. A filtering press comprising a series of filtering bags and alternating pressing racks, means for imparting motion to said racks toward and away from the filtering bags therebetween, and connections between said racks for causing successive movement thereof from end to end of the machine, each of said bags being provided with a discharge opening at its lower end, and means for simultaneously closing the open ends of the bags before the compressing operation, and means for successively releasing the bag closing means as the racks move toward their most widely spaced position, said bag closing means consisting of vertically reciprocating elements carried by the racks and attached to the lower ends of the bags.

3. In a machine of the class described, a series of filtering bags, spacing elements between the bags constructed to permit drainage of liquid from the bags, said bags having openings at their lower ends, means for compressing the bags between the spacing elements, mechanism for automatically closing and opening the lower ends of said bags by creating and releasing folds at the bottom portions of said bags, and means for causing relative agitating movement between said bags and said racks to empty and clean said bags.

4. In a machine of the class described, the combination of a series of filtering bags, pressing racks separating said bags, means for moving the bags and pressing racks toward and away from each other, means for establishing communication in seriatim between said bags and a plurality of spaced connections between the racks and substantially the entire extent of the sides of the bags for pulling the sides of the filter bags away from the contents thereof as the racks are moved to their most widely separated positions.

5. A filtering press comprising a stationary platen at one end, a movable platen at the other end, a plurality of filtering bags, a plurality of pressure racks, the said bags and racks alternating with one another and being interposed between said platens, means for automatically expanding said bags to their substantially full capacity when the movable platen moves to open operative position, means for creating and retaining folds at the bottom portions of said bags when the movable platen occupies open position, whereby said folds are retained within said bags during the filtering and pressing operation, and automatic means for releasing said folds after pressing.

6. A filtering bag for use in a press of the character described which is formed of a fabric formed in the shape of a trapezoid, the bag being open along one of its two horizontal dimensions, a plurality of spaced means secured to each side of the bag that serve as means for attaching the bag throughout its entire length to the adjacent pressing racks, at least one extensive side of the bag being provided with an opening, and a reinforcing member surrounding the said opening, the edges of the bag circumscribing the opening being turned outwardly and secured to said reinforcing member.

7. In a filtering press, a series of suspended filtering bags alternating with pressing racks, means for applying pressure simultaneously to the series of bags through the medium of the pressure racks, and bag shaking mechanism having connections for oppositely moving different portions of said bag in opposite directions.

8. In a filter press, a series of filter bags alternating with pressing bags, means for applying pressure simultaneously to the series of bags through the medium of the pressure racks, and bag shaking mechanism having connections for rapidly agitating opposite sides of said bags in opposite directions.

9. In a filtering press of the character described, the combination with a plurality of alternate filtering bags and pressing racks, said bags being arranged to automatically open when said racks move to non-pressing position, of means for simultaneously turning the open end of each bag to close said bags.

10. In a filtering press of the character described, the combination with a plurality of alternate filtering bags and pressing racks, said bags being arranged to automatically open when said racks move to non-pressing position, of means for simultaneously turning the open end of each bag to close said bags, and means cooperating with said racks to automatically hold said bags closed during at least a portion of the pressing movement of said racks.

11. In a filtering press of the character described, the combination with a plurality of alternate filtering bags and pressing racks, said bags being arranged to automatically open when said racks move to non-pressing position, of means for simultaneously turning the open end of each bag to close said bags, and automatically operable means to hold said bags closed during pressing movement of said racks and automatically releasable to allow said bags to open after the pressing operation.

12. A filtering press comprising a series of filter bags alternating with pressing bags, a guide frame along which said racks are movable, linkage mechanism for transmitting motion from rack to rack, a stationary platen at one end of said frame, a movable platen arranged to move said racks and bags toward and away from said stationary platen, means for closing said bags when said racks are in non-pressing position, means for retaining said bags closed for pressing, and means cooperating with said linkage mechanism for enabling said bags to automatically open when said racks are moved to non-pressing position.

13. A filtering press comprising a guide frame on which are movably suspended a series of pressing racks, filtering bags supported between said racks for movement therewith, toggle links connecting said racks, reciprocable means for forcing said racks toward each other whereby the filter bags may be compressed, means for simultaneously closing the open ends of said bags by rotary movement thereof when the racks are in non-pressing position, and means controlled by the toggle links enabling the release of said open ends when said racks move to non-pressing position whereby said bags are automatically opened.

14. In a machine of the class described, a series of alternate filter bags and pressing elements, a substantial part of the sides of said bags being attached to said pressing elements in spaced transverse lines over substantially the entire extent of the sides, means for moving said elements and said bags toward each other to compress the filled bags and away from each other to enable emptying said bags, and means operative adjacent the vertical edges of said bags for shaking said bags.

15. In a machine of the character described, a series of alternate filter bags and pressing elements, means to enable filling the bags, means for moving the elements and bags toward each other to compress the filled bags and away from each other to enable emptying the bags, a bag shaking mechanism, and means for connecting the bags adjacent their substantially vertical edges to said shaker.

16. A filtering bag for use in a press of the character described, which is formed in the shape of a trapezoid, the bag being open along one horizontal dimension, and a plurality of spaced means secured to each side of the bag that serve as attaching means for the bag throughout substantially its entire length.

JOHN B. BERRIGAN.
FELIX P. GROSS.
WESLEY V. WOODRUFF.